United States Patent
Hasuo

(10) Patent No.: US 10,239,215 B2
(45) Date of Patent: Mar. 26, 2019

(54) TRANSFER TOOL

(71) Applicant: Fanuc Corporation, Yamanashi (JP)

(72) Inventor: Takeshi Hasuo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/867,360

(22) Filed: Jan. 10, 2018

(65) Prior Publication Data

US 2018/0229375 A1    Aug. 16, 2018

(30) Foreign Application Priority Data

Feb. 13, 2017    (JP) ................................ 2017-023887

(51) Int. Cl.
| | |
|---|---|
| B25J 15/00 | (2006.01) |
| B25J 9/06 | (2006.01) |
| B25J 9/00 | (2006.01) |
| B25J 9/04 | (2006.01) |
| B25J 15/06 | (2006.01) |
| B21D 43/05 | (2006.01) |

(52) U.S. Cl.
CPC ........ *B25J 15/0014* (2013.01); *B21D 43/052* (2013.01); *B25J 9/0027* (2013.01); *B25J 9/047* (2013.01); *B25J 9/06* (2013.01); *B25J 15/0616* (2013.01)

(58) Field of Classification Search
CPC ....... B25J 15/0014; B25J 18/025; B25J 19/06
USPC .......................................... 414/732; 700/228
See application file for complete search history.

(56) References Cited

U.S. PATENT DOCUMENTS

| | | | |
|---|---|---|---|
| 4,827,463 A | 5/1989 | Motoyoshi et al. | |
| 8,918,204 B2 * | 12/2014 | Cho ....................... | B21D 43/05 414/225.01 |
| 2001/0033144 A1 | 10/2001 | Doi | |
| 2006/0011010 A1 | 1/2006 | Koyama et al. | |

(Continued)

FOREIGN PATENT DOCUMENTS

| | | |
|---|---|---|
| EP | 1142674 A2 | 10/2001 |
| EP | 1616673 A1 | 1/2006 |

(Continued)

OTHER PUBLICATIONS

Japan Patent Office, Office Action dated Oct. 2, 2018 for Japan Patent Application No. 2017-023887.

(Continued)

*Primary Examiner* — Ronald P Jarrett
(74) *Attorney, Agent, or Firm* — Winstead PC

(57) ABSTRACT

Provided a transfer tool including a substantially strip-shaped frame, a wrist-side slider to be attached to a wrist of a robot, provided on one side of the frame in a thickness direction in a manner capable of moving along a longitudinal direction of the frame, a workpiece-side slider provided on another side of the frame in the thickness direction in a manner capable of moving along the longitudinal direction of the frame, and a distal-end swing shaft attached to the workpiece-side slider, where the distal-end swing shaft includes a workpiece support section supported by the workpiece-side slider in a manner capable of swinging around an axis line extending in a width direction of the frame, the workpiece support section being for supporting a workpiece, and an actuator attached to the workpiece-side slider, the actuator being for causing the workpiece support section to swing.

5 Claims, 9 Drawing Sheets

(56) References Cited

U.S. PATENT DOCUMENTS

| | | |
|---|---|---|
| 2012/0239184 A1 | 9/2012 | Cho et al. |
| 2012/0282066 A1 | 11/2012 | Naumann et al. |
| 2016/0059300 A1 | 3/2016 | Takeda |
| 2018/0021961 A1 | 1/2018 | Hasuo |

FOREIGN PATENT DOCUMENTS

| | | |
|---|---|---|
| EP | 2990135 A2 | 3/2016 |
| JP | S60-016380 A | 1/1985 |
| JP | S60-066490 U | 5/1985 |
| JP | S63-278784 A | 11/1988 |
| JP | H02-107481 U | 8/1990 |
| JP | H08-141969 A | 6/1996 |
| JP | 3560908 B2 | 9/2004 |
| JP | 2006-026807 A | 2/2006 |
| JP | 2007-210085 A | 8/2007 |
| JP | 2008-137133 A | 6/2008 |
| JP | 2010-46706 A | 3/2010 |
| JP | 2010-94695 A | 4/2010 |
| JP | 2013-047552 A | 3/2013 |
| JP | 2016-49539 A | 4/2016 |
| JP | 2018-012165 A | 1/2018 |

OTHER PUBLICATIONS

Japan Patent Office, Search Report dated Sep. 27, 2018 for Japan Patent Application No. 2017-023887.

* cited by examiner

TRANSFER TOOL

CROSS-REFERENCE TO RELATED APPLICATIONS

This application claims the benefit of Japanese Patent Application No. 2017-023887, the content of which is incorporated herein by reference.

TECHNICAL FIELD

The present invention relates to a transfer tool.

BACKGROUND ART

Conventionally, to increase the speed of transfer of a workpiece between press devices and to extend the reach, a transfer tool configured from a slide mechanism which is attached to a tip of a wrist of an articulated robot and which linearly moves a workpiece in one direction is known (for example, see PTL 1).

The transfer tool described in PTL 1 includes, on front and back surfaces of a strip-shaped frame, two sliders which are supported in a manner capable of linearly moving along a longitudinal direction of the frame and which are coupled to each other by a belt.

With this transfer tool, when a wrist-side slider fixed to a wrist of an articulated robot is driven in one direction along the longitudinal direction of the frame, a workpiece-side slider supporting a workpiece is moved in the opposite direction, and thus, transfer of the workpiece may be performed at a high speed, and also, the reach may be extended to the extent of a movable range of each slider, and a stroke two times the movable range of each slider may be obtained.

Furthermore, the transfer tool in PTL 1 includes, at the workpiece-side slider, a distal-end swing shaft for causing a workpiece to swing around an axis line extending in a width direction of the frame. By causing the distal-end swing shaft to operate, the attitude of a supported workpiece may be changed without moving the frame of the transfer tool.

CITATION LIST

Patent Literature

{PTL 1}
U.S. Patent Application Publication No. 2012/239184

SUMMARY OF INVENTION

An aspect of the present invention provides a transfer tool including a substantially strip-shaped frame, a wrist-side slider to be attached to a wrist of a robot, provided on one side of the frame in a thickness direction in a manner capable of moving along a longitudinal direction of the frame, a workpiece-side slider provided on another side of the frame in the thickness direction in a manner capable of moving along the longitudinal direction of the frame, and a distal-end swing shaft attached to the workpiece-side slider. The distal-end swing shaft includes a workpiece support section that is for supporting a workpiece and that is supported by the workpiece-side slider in a manner capable of swinging around an axis line extending in a width direction of the frame, and an actuator that is attached to the workpiece-side slider and that is for causing the workpiece support section to swing.

DESCRIPTION OF EMBODIMENTS

A transfer tool 1 according to an embodiment of the present invention will be described below with reference to the drawings.

Figure 1:
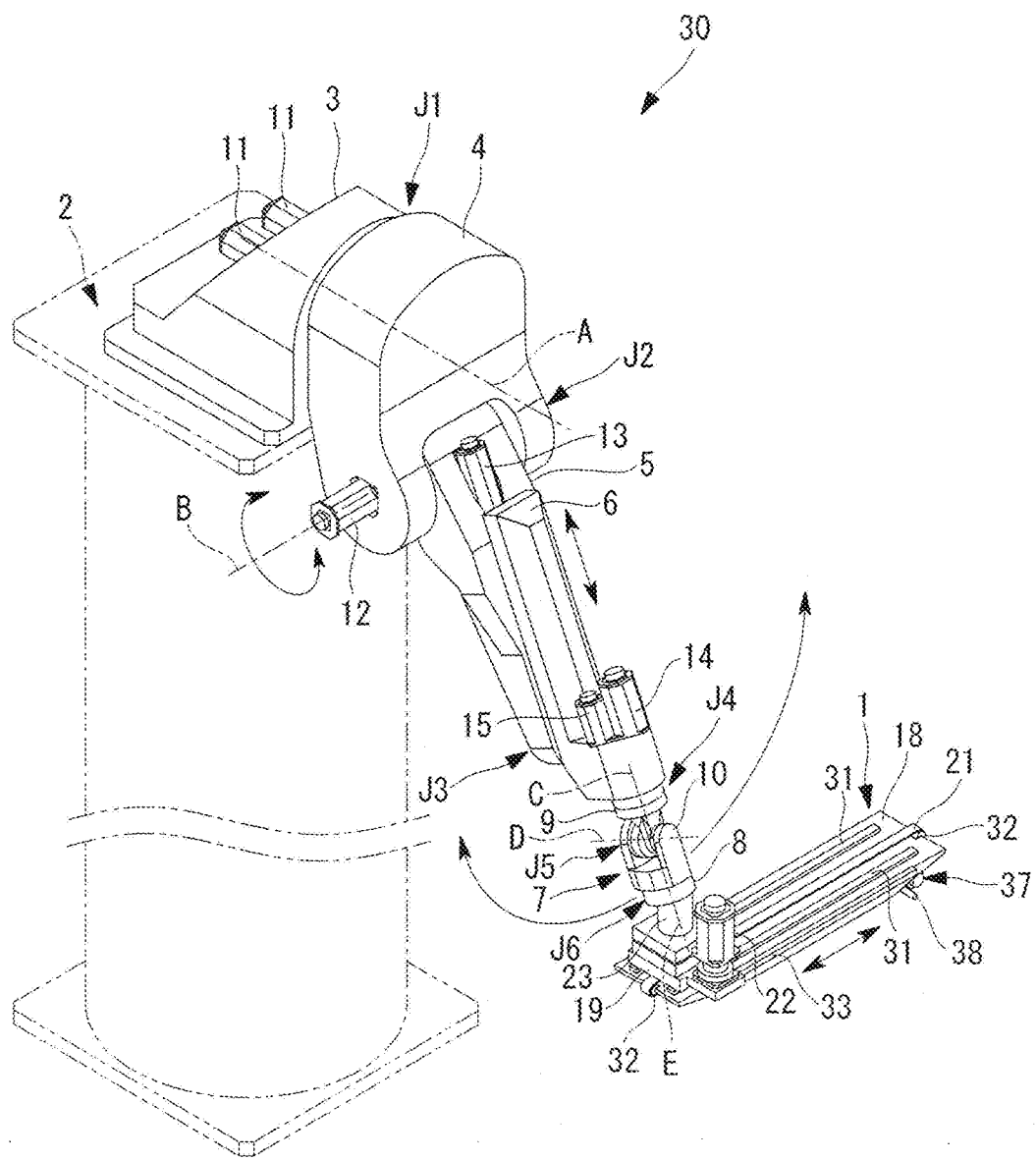
FIG. 1 is a perspective view showing a robot system to which a transfer tool according to an embodiment of the present invention is attached.

As shown in FIG. 1, the transfer tool 1 according to the present embodiment is a device of a slide arm type which is attached to a tip of the wrist of an articulated robot (robot) 30.

For example, as shown in FIG. 1, the articulated robot 30 includes a base 3 fixed to a support base 2, a swivel base 4 supported in a manner capable of rotating around a horizontal first axis line A horizontal to one side surface of the base 3, a first arm 5 supported in a manner capable of swinging around a second axis line B perpendicular to an axis line (not shown) parallel to and separated from the first axis line A, a second arm 6 supported in a manner capable of linearly moving in a longitudinal direction of the first arm 5, and a wrist unit (wrist) 7 disposed at a tip of the second arm 6.

That is, the articulated robot 30 includes a first shaft J1 for causing the swivel base 4 to rotate around the first axis line A with respect to the base 3, a second shaft J2 for causing the first arm 5 to swing around the second axis line B with respect to the swivel base 4, and a third shaft J3 for causing the second arm 6 to linearly move in the longitudinal direction of the first arm 5 with respect to the first arm 5.

As for the wrist unit 7, it is enough if two or more rotation shafts which rotate around axis lines C, D, E intersecting with one another are provided.

The wrist unit 7 includes three rotation shafts (fourth shaft J4, fifth shaft J5, and sixth shaft J6) which rotate around the perpendicular axis lines C, D, E, and a face plate 8 which is disposed to fix a tool or the like to the rotation shaft J6 at a terminal. The fourth shaft J4 causes a first wrist housing 9 to rotate, with respect to the second arm 6, around a fourth axis line (rotation shaft) C parallel to the longitudinal direction of the first arm 5, the fifth shaft J5 causes a second wrist housing 10 to rotate around a fifth axis line (rotation shaft) D perpendicular to the fourth axis line C, and the sixth shaft J6 causes the face plate 8 to rotate around a sixth axis line (rotation shaft) E perpendicular to the fifth axis line D. In the drawing, reference signs 11 to 16 indicate motors of the first shaft J1 to the sixth shaft J6, respectively.

The first shaft J1 causes the swivel base 4 to rotate around the horizontal first axis line A, and thus, causes the swivel base 4 and the first arm 5 attached to the swivel base 4 to the wrist unit 7 to swing like a pendulum. An operation range of such a pendulum-like motion is at or below a substantially horizontal plane including the first axis line A. In the case of transferring a workpiece (not shown) by the pendulum-like motion, because gravity constantly acts in the direction of aiding acceleration or deceleration, the swinging operation due to operation of the first shaft J1 may be performed at a high speed and with little energy.

The second shaft J2 is capable of changing a tilt of the first arm 5 with respect to the swivel base 4. The third shaft J3 is capable of causing the second arm 6 to linearly move with respect to the first arm 5, and of extending or shortening the length of the entire arm formed from the first arm 5 and second arm 6.

That is, the wrist unit 7 may be arranged at an arbitrary position in the operation range by the first shaft J1 to the third shaft J3. Moreover, the attitude of a workpiece attached to the face plate 8 may be arbitrarily adjusted by the fourth shaft J4 to the sixth shaft J6.

The transfer tool 1 according to the present embodiment includes a frame 18 which is strip-shaped (rectangular flat plate shape), and two sliders 19, 20 which are disposed on both sides of the frame 18 in a thickness direction.

Figure 2:
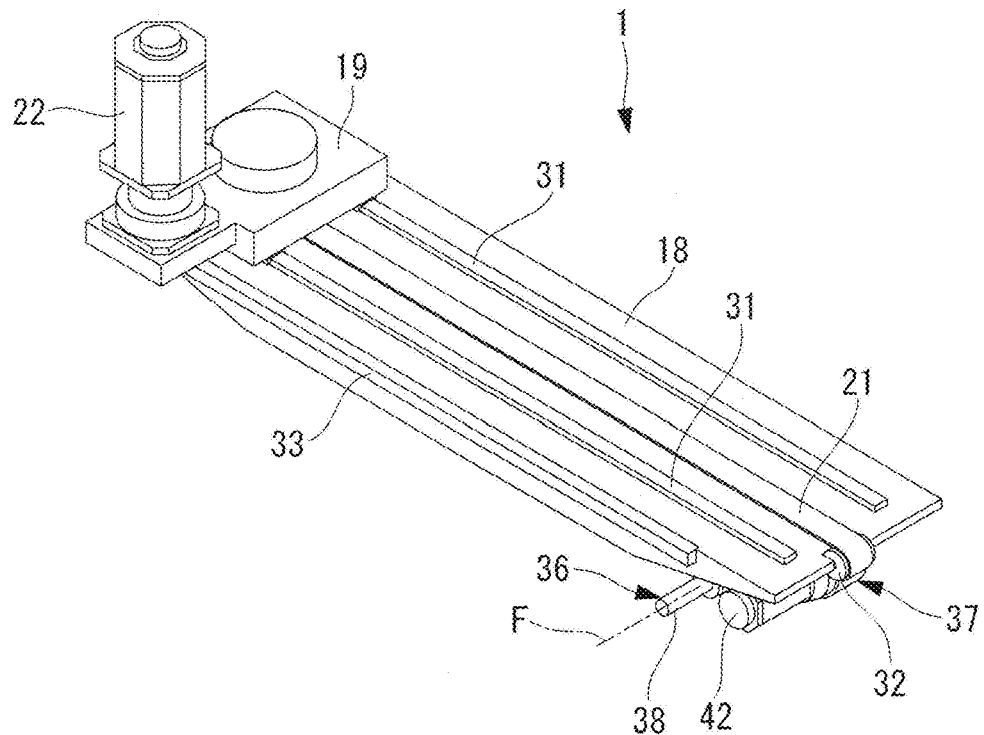
FIG. 2 is a perspective view showing the transfer tool in FIG. 1 from the side of a wrist-side slider.
Figure 3:
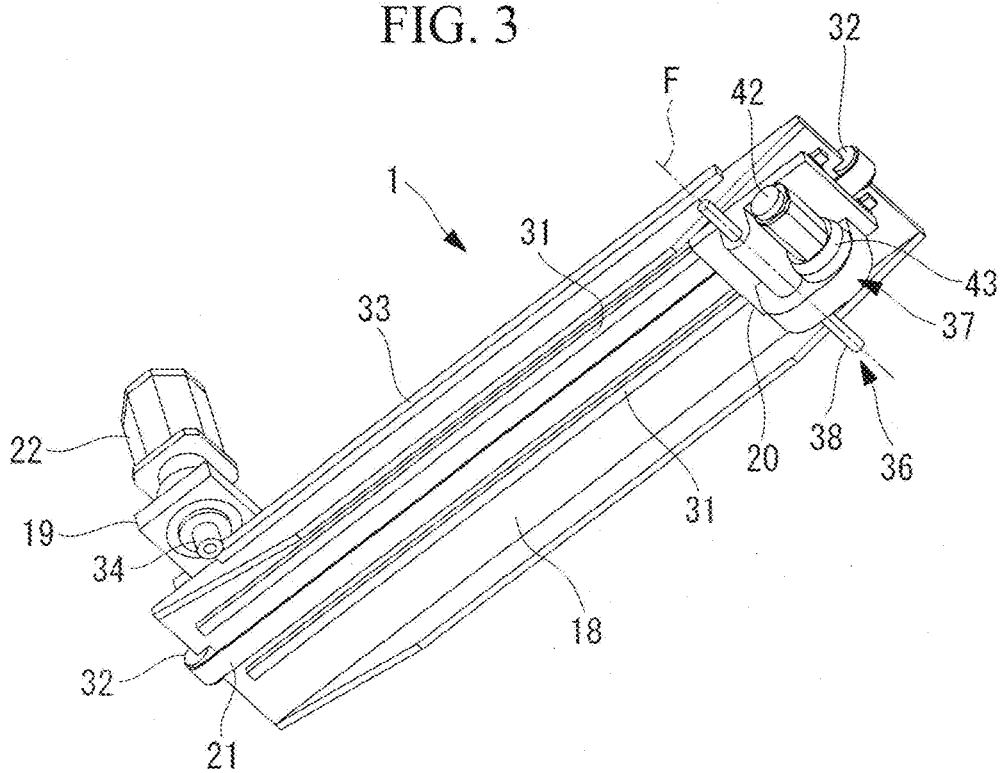
FIG. 3 is a perspective view showing the transfer tool in FIG. 1 from the side of a workpiece-side slider.

As shown in FIGS. 2 and 3, the two sliders 19, 20 are supported on front and back surfaces of the frame 18 in a manner capable of moving in a longitudinal direction along guide rails 31 disposed along a longitudinal direction of the frame 18. Furthermore, the two sliders 19, 20 are coupled by a belt 21 which is wound around pulleys 32 which are supported at both ends of the frame 18 in the longitudinal direction in a manner capable of rotating around parallel axis lines.

A rack gear 33 is fixed on one end surface of the frame 18 in a width direction, along the longitudinal direction. As shown in FIG. 3, the rack gear 33 is meshed with a pinion gear 34 of a motor 22 attached to the slider (wrist-side slider) 19. When the slider 19 is moved in one direction along the longitudinal direction on the front surface of the frame 18 by the motor 22 being driven, the other slider (workpiece-side slider) 20 coupled by the belt 21 is pulled by the belt 21 and is moved in the other direction along the longitudinal direction on the back side of the frame 18. That is, the two sliders 19, 20 are to relatively move in opposite directions along the longitudinal direction of the frame 18.

Figure 4:
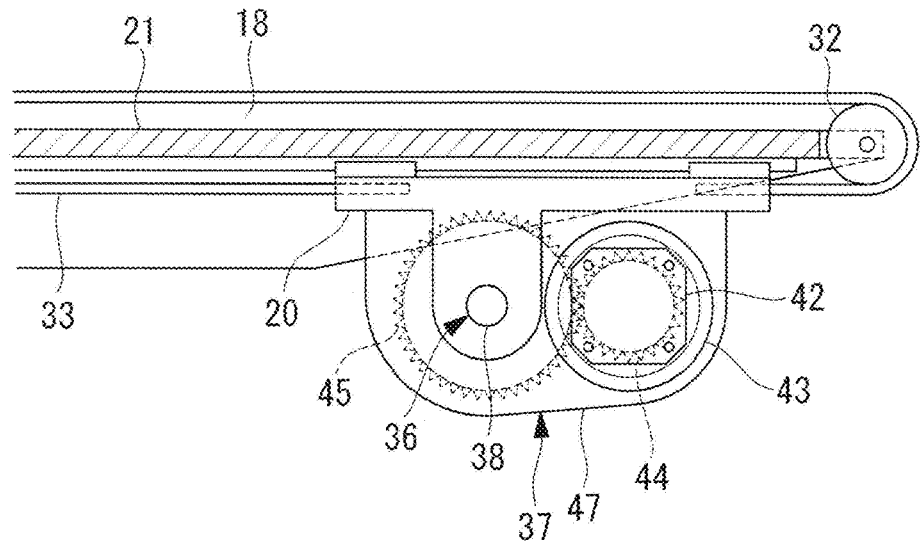
FIG. 4 is a front view showing a distal-end swing shaft provided on the workpiece-side slider of the transfer tool in FIG. 1.
Figure 5:
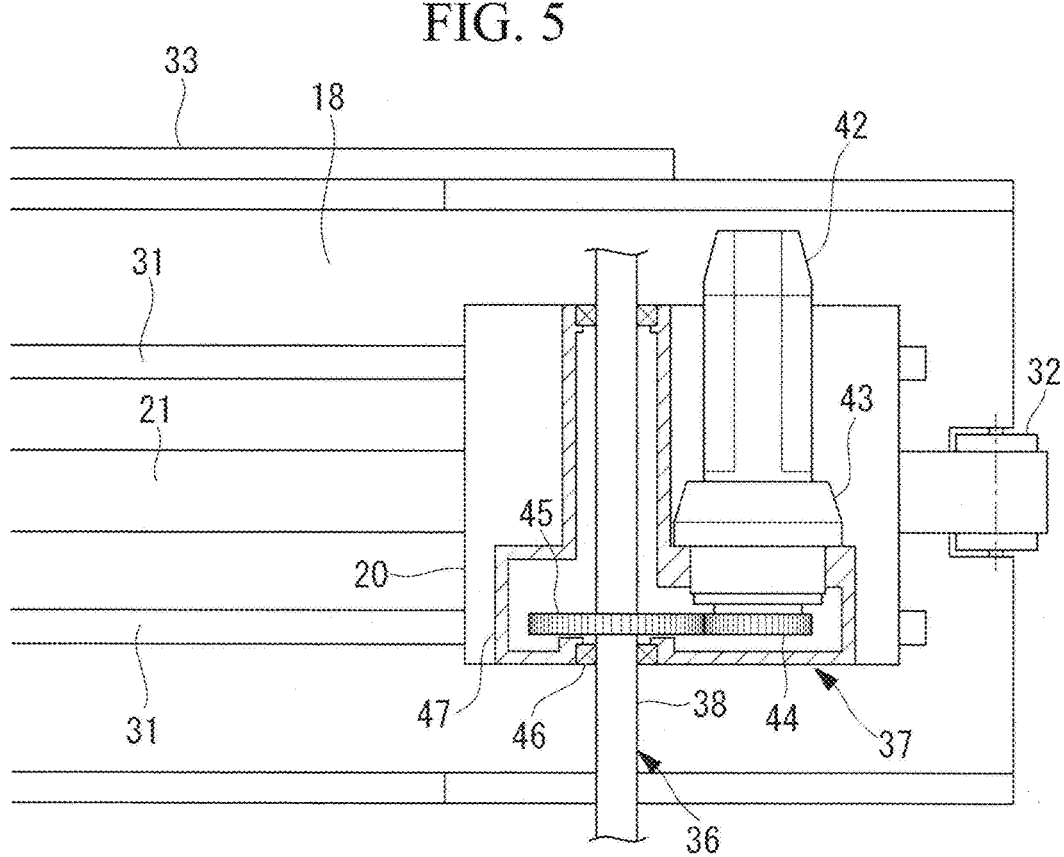
FIG. 5 is a plan view, partly broken away, showing the distal-end swing shaft in FIG. 2.

The slider 19 is fixed to the sixth shaft J6 of the wrist unit 7. As shown in FIGS. 4 and 5, the other slider 20 includes a workpiece support section 36 to which a tool S (see FIGS. 6 and 7) including a plurality of suction pads 35 for sticking to a workpiece is to be attached, and a distal-end swing shaft 37 for causing the workpiece support section 36 to swing around an axis line F extending in the width direction of the frame 18.

Figure 10:
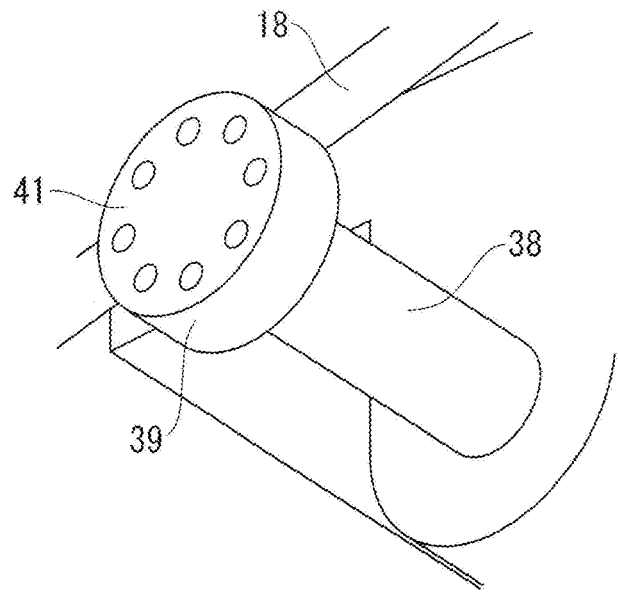
FIG. 10 is a perspective view showing an example of an interface portion provided on both ends of a shaft forming the distal-end swing shaft of the transfer tool in FIG. 1.
Figure 11:
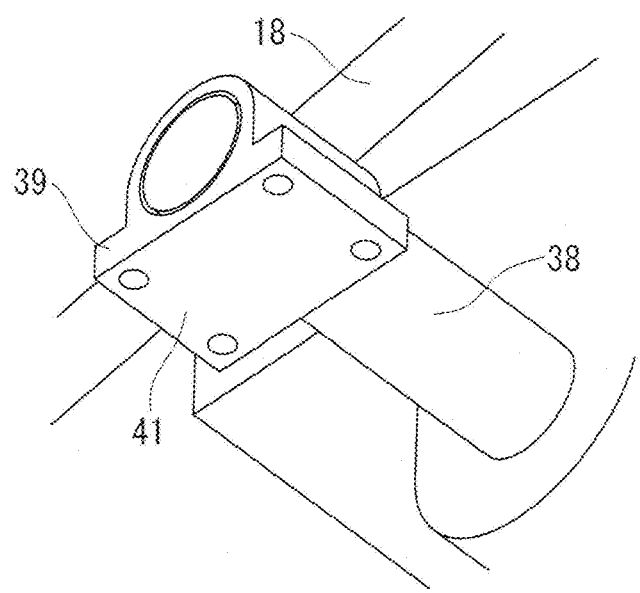
FIG. 11 is a perspective view showing another example of the interface portion in FIG. 10.

The workpiece support section 36 includes a straight rod-shaped shaft 38 attached to the slider 20 in a manner capable of rotating around the axis line F, and two interface portions 39, 40 fixed on both ends of the shaft 38, as shown in FIG. 10 or 11, for example. The two interface portions 39, 40 include attachment surfaces 41 which are parallel to each other. Accordingly, angle alignment does not have to be performed at the time of attaching the tool S to the interface portions 39, 40, and attachment can be easily performed.

As shown in FIGS. 4 and 5, the distal-end swing shaft 37 includes a motor (actuator) 42, a reducer (actuator) 43 for reducing the speed of rotation of the motor 42, and a pair of gears (power transmission section, actuator) 44, 45 for transmitting an output torque of the reducer 43 to the shaft 38. An output shaft of the reducer 43, and a bearing 46 for rotatably supporting the pair of gears 44, 45 and the shaft 38 are housed in a gearbox 47, and are collectively lubricated.

The gearbox 47 is fixed to the slider 20, and the motor 42 is fixed to the gearbox 47 via the reducer 43. The motor 42 is disposed in parallel to the axis line F of the shaft 38. For example, the pair of gears 44, 45 are spur gears, and are a drive gear 44 fixed to the output shaft of the reducer 43, and a driven gear 45 fixed to the shaft 38. A diameter of the driven gear 45 is sufficiently larger than that of the drive gear 44, and the speed of rotation of the drive gear 44 is thus reduced and is transmitted to the shaft 38.

Figure 6:
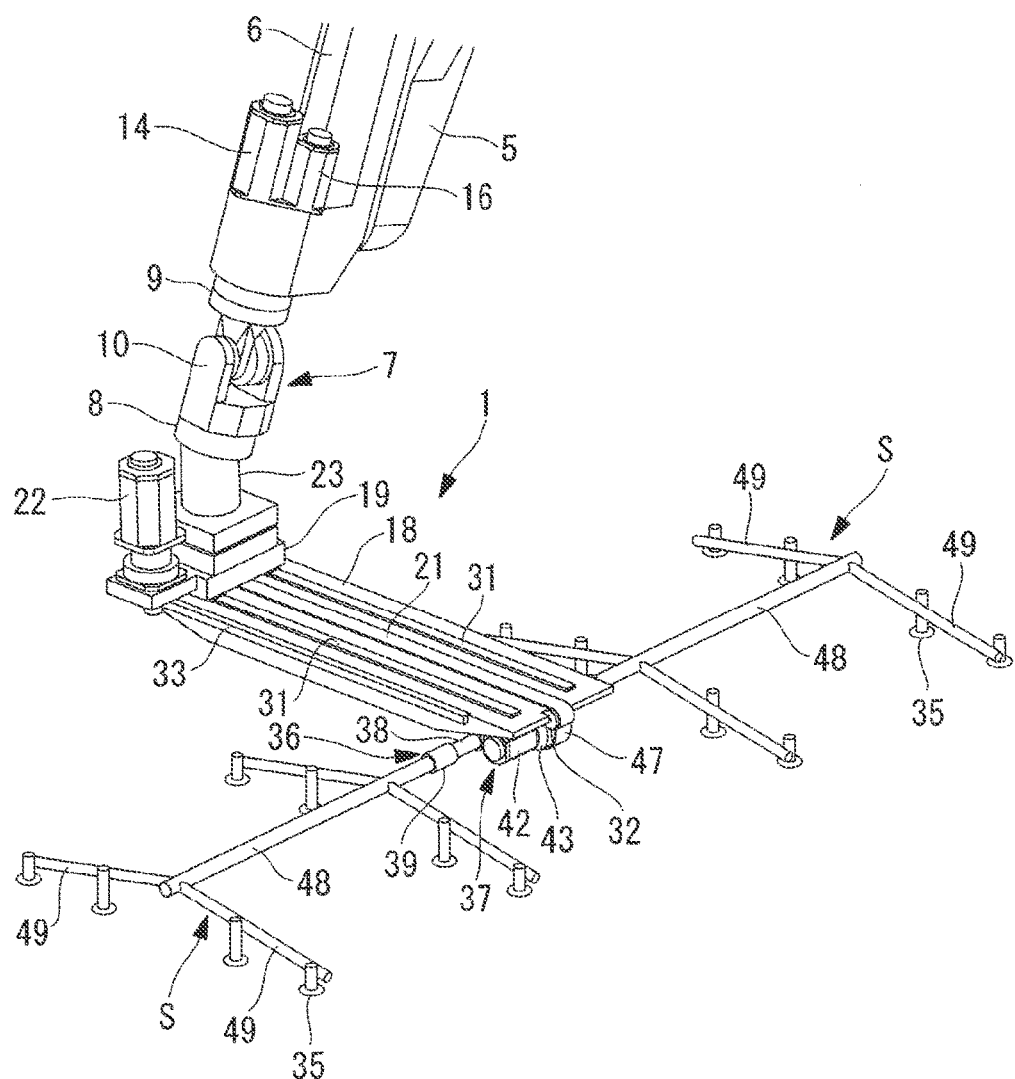
FIG. 6 is a perspective view describing supply and removal of a workpiece to and from a press device by the robot system in FIG. 1.

As shown in FIG. 6, the tool S includes a strut portion 48 fixed to each of the pair of interface portions 39, 40 on both ends of the shaft 38, and a plurality of branch portions 49 branched and extending from the strut portion 48, and a plurality of suction pads 35 are disposed at each branch portion 49 while facing the same direction.

Figure 7:
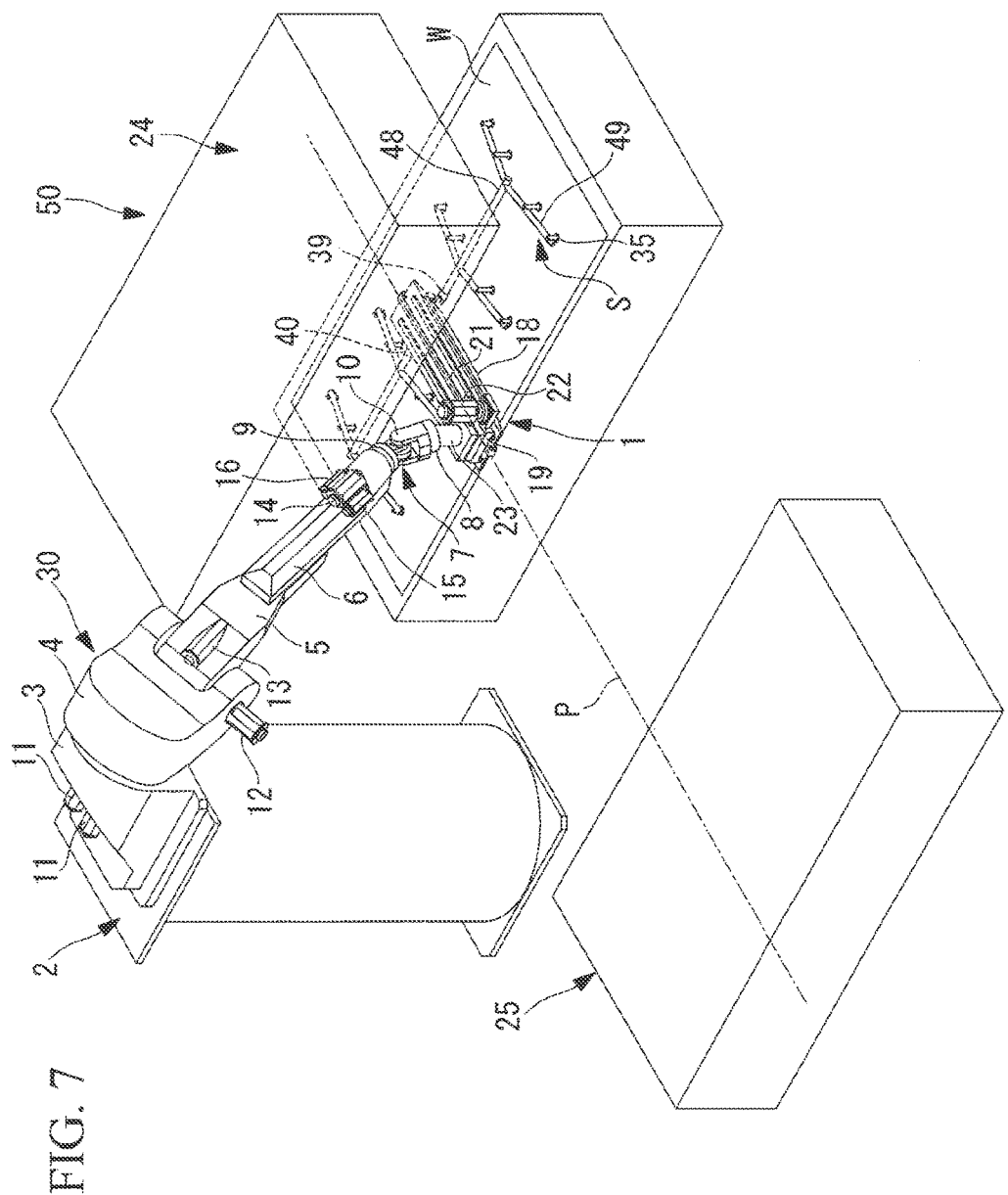
FIG. 7 is a perspective view showing an example of a tool that is attached to the transfer tool in FIG. 1.

For example, as shown in FIG. 7, the tool S supplies a flat plate-shaped workpiece W to a press device 24, 25, and sticks to or releases the workpiece W by the suction pads 35 at the time of removing the workpiece W processed by the press device 24, 25.

Furthermore, as shown in FIG. 1, the articulated robot 30 includes a tilted coupling member 23 for fixing together at a predetermined tilt angle the face plate 8 of the wrist unit 7 and one of the sliders (slider 19) to be fixed to the face plate 8.

The tilted coupling member 23 causes the first arm 5 to swing around the second axis line B by a predetermined angle, and couples the sixth shaft J6 of the wrist unit 7 and the transfer tool 1 in such a way that the width direction and the longitudinal direction of the transfer tool 1 become substantially horizontal when the wrist unit 7 is made straight, that is, in a state where the fourth axis line C and the sixth axis line E are on one straight line.

An effect of the transfer tool 1 according to the present embodiment configured in the above manner will be particularly described for a case where supply and removal of a workpiece W are performed between two press devices 24, 25 which are adjacent to each other with a gap therebetween, as in the case of a press machine system 50 shown in FIG. 6.

As shown in FIG. 1, the articulated robot 30 causes the first arm 5 to swing around the second axis line B by a predetermined angle, and thereby arranges the frame 18 of the transfer tool 1 at a substantially horizontal attitude. At this time, the center of the transfer tool 1 in the width direction is to be arranged on a straight line (press center line) P connecting centers of the press devices 24, 25.

Next, as shown in FIG. 6, the swivel base 4 is rotated in one direction around the first axis line A with respect to the base 3, the first arm 5 and the second arm 6 are moved like a pendulum, and each rotation shaft J4, J5, J6 of the wrist unit 7 is operated, and the transfer tool 1 thereby moves along the press center line P while maintaining the substantially horizontal attitude and maintaining the longitudinal direction and the width direction at constant directions. At this time, the motor 22 of the transfer tool 1 is operated, and the two sliders 19, 20 are moved relative to each other in such a way that the frame 18 extends forward in the swing direction of the first arm 5.

Accordingly, it is possible to insert only the transfer tool 1 into one of the press devices (press device 24) in a state where the wrist unit 7 is disposed outside the press devices 24, 25. Moreover, at this position, a workpiece W in the press device 24, such as sheet metal which has been subjected to one step of press machining, can be caught and be removed from a mold (not shown) of the press device 24 by the tool S provided at the slider 19.

In this state, the swivel base 4, the first arm 5, and the second arm 6 are moved like a pendulum to bring the wrist unit 7 close to the other press device (press device 25), the wrist unit 7 is operated to maintain the attitude of the transfer tool 1, and the transfer tool 1 is operated to move the two sliders 19, 20 relative to each other in such a way that the frame 18 and the workpiece W gripped by the tool S are inserted into the other press device (press device 25). Also in this case, the transfer tool 1 is moved along the press center line P, and thus, the tool S may be operated to release the transferred workpiece W and to drop the workpiece W into the mold of the other press device (press device 25).

That is, the transfer tool 1 includes the strip-shaped frame 18, and has a thickness dimension sufficiently smaller than that of the wrist unit 7. Accordingly, the transfer tool 1 may be easily inserted even into a small gap of a vertically opened mold in the press device 24, 25 to grip or release a workpiece W.

Particularly, in the case of transferring a workpiece W between the press devices 24, 25, the efficiency of a pressing step is desired to be increased by causing the tool S for gripping the workpiece W to enter immediately after the mold of the press device 24, 25 starts to open, and to retract from the press device 24, 25 immediately before the mold closes. Accordingly, the transfer tool 1 having a small thickness dimension is suitable as a mechanism for entering into the press device 24, 25.

Furthermore, the wrist unit 7 is moved along a straight track by rotation of the swivel base 4, swinging of the first arm 5, and linear movement of the second arm 6, while maintaining constant attitude of the transfer tool 1 by the wrist unit 7 having the three shafts J4, J5, J6, and thus, the transfer tool 1 may be moved on the same plane, and there is an advantage that interference between each part of the press device 24, 25 and the transfer tool 1 can be avoided.

Furthermore, by causing the second arm 6 to linearly move in the longitudinal direction with respect to the first arm 5, the shape of the entire arm formed from the first arm 5 and the second arm 6 may be constantly maintained to be substantially straight, and there is an advantage that interference of each part of the first arm 5 and the second arm 6 with each part of the press device 24, 25 and peripheral equipments can be avoided.

Moreover, the transfer tool 1 horizontally moves the frame 18 by moving the two sliders 19, 20 relative to each other in the horizontal direction, and thus, by causing the movement direction of the frame 18 to coincide with the transfer direction of the workpiece W, an advantage that the workpiece W can be transferred at a high speed by the operation of the transfer tool 1, without greatly moving the wrist unit 7 at the time of transfer of the workpiece W, may be achieved.

Moreover, with the articulated robot 30, attachment is performed with the sixth axis line E of the wrist unit 7 being tilted, by the tilted coupling member 23, in the width direction of the frame 18 of the transfer tool 1, and there is an advantage that each rotation shaft J4, J5, J6 of the wrist unit 7 can be prevented from being forcibly moved at the time of causing the frame 18 of the transfer tool 1 to move at a substantially horizontal attitude.

That is, by setting the frame 18 of the transfer tool 1 to be at a substantially horizontal attitude by the tilted coupling member 23 even in a state where each of the rotation shafts J4, J5, J6 of the wrist unit 7 is arranged at an origin position, the rotation angle of each rotation shaft J4, J5, J6 of the wrist unit 7 during transfer of a workpiece W is not made great, and there is an advantage that the speed of transfer of a workpiece W can be increased.

Furthermore, with the transfer tool 1 according to the present embodiment, of the two sliders 19, 20, the tool S is attached, via the distal-end swing shaft 37, to the slider 20, which is disposed on the opposite side of the frame 18 from the slider 19 fixed to the sixth shaft J6 of the wrist unit 7, and thus, the angle of the tool S around the axis line F along the width direction of the frame 18 may be changed by operation of the distal-end swing shaft 37.

Figure 8:
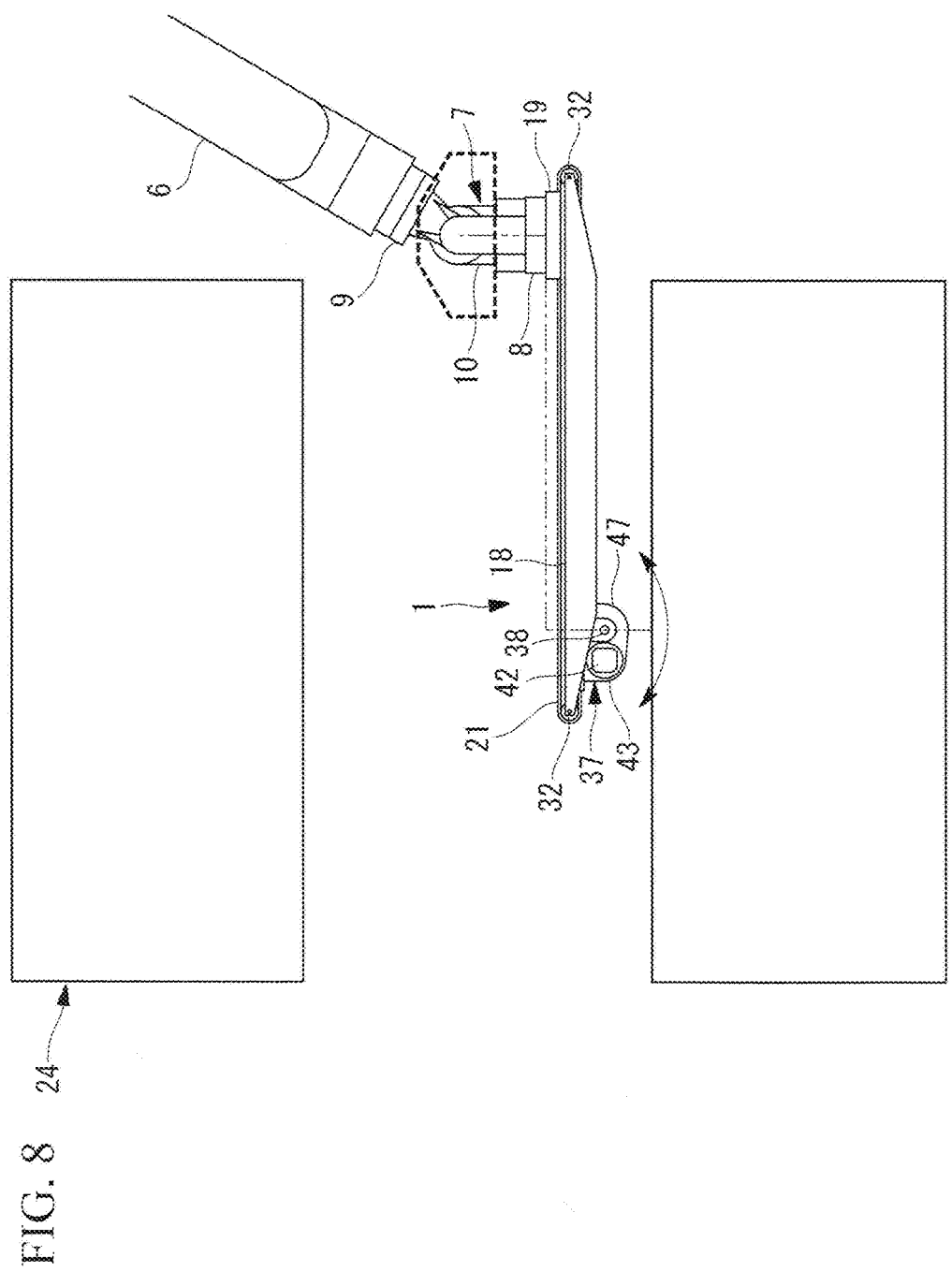
FIG. 8 is a front view showing an operation range of an articulated robot where an angle of a workpiece is changed by the distal-end swing shaft of the transfer tool in FIG. 1.

Due to variations in the shape of the workpiece W to be pressed, the direction of removal of the workpiece W from the mold of the press device 24, 25 is not limited to a vertical direction. As shown in FIG. 8, by operating the distal-end swing shaft 37 and tilting the tool S, the tilt of the tool S can be aligned with the direction of removal of the workpiece W without changing the attitude of the transfer tool 1. FIG. 8 shows a case where the tilted coupling member 23 is not provided.

Figure 9:
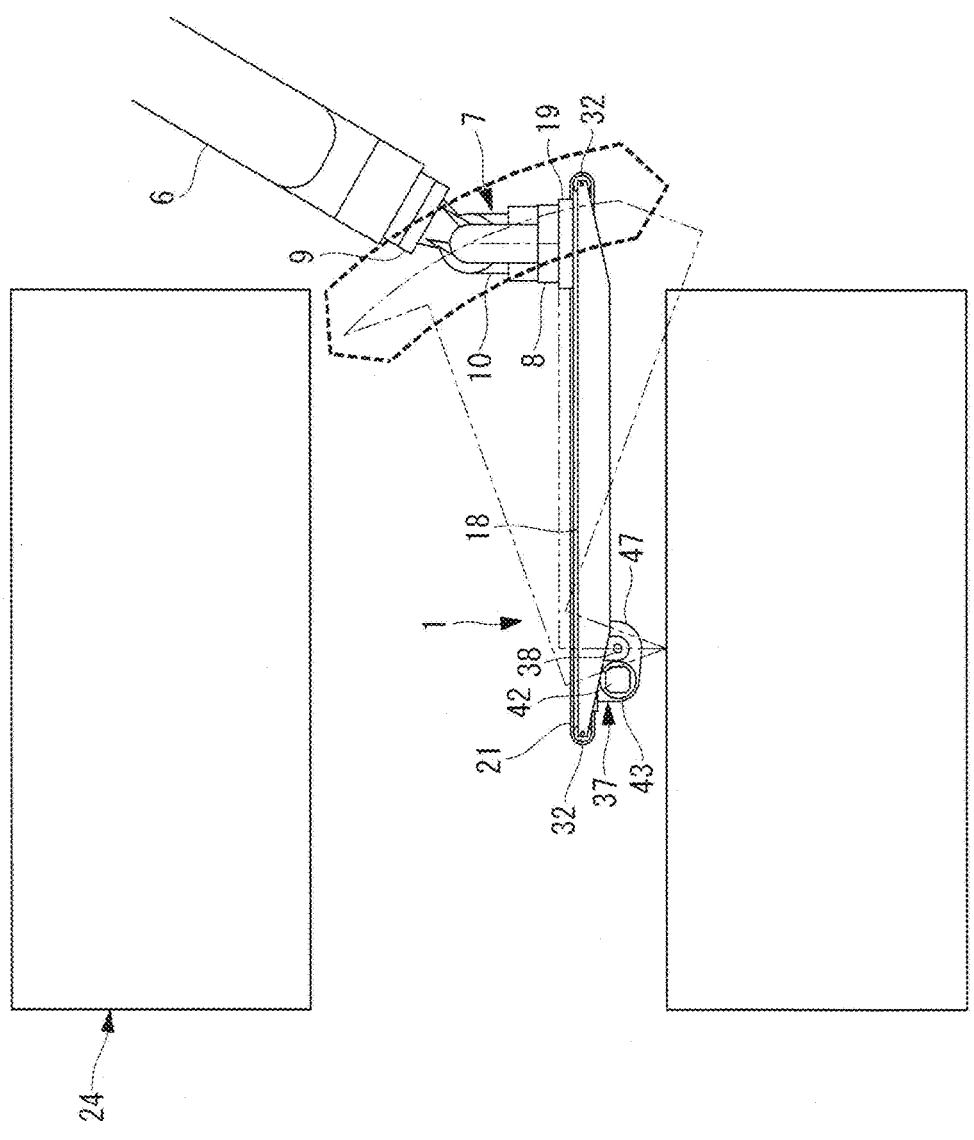
FIG. 9 is a front view showing the operation range of the articulated robot where an angle of a workpiece is changed at the transfer tool in FIG. 1, without the use of the distal-end swing shaft.

As shown in FIG. 9, if the distal-end swing shaft 37 is not used, or if the distal-end swing shaft 37 is not provided, changing the tilt of the tool S causes the attitude of the transfer tool 1 to be changed by movement of the position of the wrist unit 7 of the articulated robot 30, and the possibility of interference of the second arm 6, the wrist unit 7, and the transfer tool 1 with the press device 24, 25 and peripheral equipments is increased. A broken line in FIG. 9 indicates a movement range of the wrist unit 7 for gripping a workpiece W by the tool S.

That is, as shown in FIG. 9, by including the distal-end swing shaft 37, the transfer tool 1 according to the present embodiment can achieve advantages that interference with the press device 24, 25 and peripheral equipments can be easily avoided, and that movement of the swivel base 4, the first arm 5, the second arm 6, and the wrist unit 7 for changing the angle of the tool S may be minimized to prevent an increase in the transfer time.

Moreover, with the transfer tool 1 according to the present embodiment, the motor 42 for generating power for swinging the workpiece support section 36 around the axis line F is mounted on the slider 20 rotatably supporting the workpiece support section 36, near the workpiece support section 36, and thus, driving does not have to be performed as in the past by a belt (not shown), for driving the distal-end swing shaft, having a length two times the longitudinal dimension of the frame 18, and the workpiece support section 36 can be efficiently swung. As a result, friction caused by driving by a belt can be reduced and power can be efficiently used, and the motor 42 for driving the workpiece support section 36 can be miniaturized.

Moreover, because output of the motor 42 is transmitted to the shaft 38 via the reducer 43 and the gears 44, 45, which are rigid mechanical elements, fluctuations in load torque acting on the shaft 38 may be easily detected based on a change in the current value of the motor 42. Accordingly, whether the tool S or the workpiece W has interfered with peripheral equipments or not can be detected with high accuracy, for example. There is also an advantage that, compared with a belt for driving the distal-end swing shaft, the frequency of maintenance can be greatly reduced.

Moreover, with the transfer tool 1 according to the present embodiment, the output shaft of the reducer 43 is coupled to the workpiece support section 36 not directly but via the pair of gears 44, 45, and thus, the motor 42 does not have to be coaxially disposed on the axis line F of the workpiece support section 36, and the workpiece support section 36 may be extended on both sides of the frame 18 in the width direction and the pair of interface portions 39, 40 may be provided on both ends.

Accordingly, as shown in FIG. 6, in the case where, in order to transfer a relatively large workpiece W, the tool S and the workpiece W are disposed in a manner extending on both sides of the frame 18 in the width direction, the tool S may be attached to the interface portions 39, 40 disposed on both sides of the frame 18 in the width direction, and the frame 18 may be easily arranged approximately at the position of the center of gravity of the tool S and workpiece W. An advantage that transfer may be performed while easily maintaining the weight balance of the large tool S and the large workpiece W may thus be achieved.

Furthermore, in the present embodiment, the pair of gears 44, 45 between the output shaft of the reducer 43 and the workpiece support section 36 have a reduction ratio by which the output of the reducer 43 is transmitted to the workpiece support section 36 after being reduced in the speed of rotation, and thus, the output torque of the reducer 43 may be amplified and transmitted to the workpiece support section 36. Therefore, the sizes and weights of the motor 42 and the reducer 43 may be further reduced.

Additionally, in the present embodiment, the distal-end swing shaft 37 includes the motor 42 which is disposed in parallel to the axis line F for swinging the shaft 38, and power from the motor 42 and the reducer 43 is transmitted to the shaft 38 via the pair of gears 44, 45, but this is not restrictive, and the motor 42 may be disposed intersecting with the shaft 38 and power may be transmitted by a bevel gear. Moreover, the power transmission section is not limited to the pair of gears 44, 45, which are spur gears, and may alternatively be a gear train formed from a plurality of gears.

Moreover, the reducer 43 may adopt a structure which allows sealing of a lubricant by an independent sealing means so that lubrication is performed separately from lubrication in the gearbox 47. This allows the reducer 43 to be easily replaced.

Figure 12:
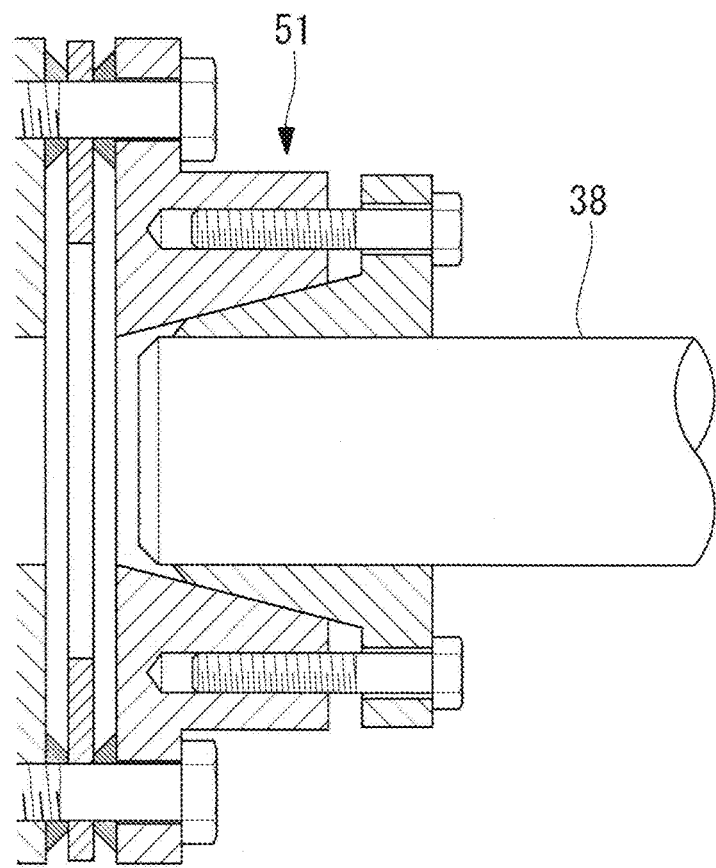
FIG. 12 is a vertical cross-sectional view showing an example of attachment of the interface portion in FIG. 10 to the shaft.

Moreover, instead of being integrally fixed to the shaft 38, the interface portions 39, 40 on both ends of the shaft 38 may be a friction coupling 51 which is detachably fixed by friction to an outer circumferential surface of the rod-shaped shaft 38 by a wedge effect, as shown in FIG. 12. This allows use of interface portions 39, 40 which are suitable for a tool S.

From the above-described embodiment, the following invention is derived.

An aspect of the present invention provides a transfer tool including a substantially strip-shaped frame, a wrist-side slider to be attached to a wrist of a robot, provided on one side of the frame in a thickness direction in a manner capable of moving along a longitudinal direction of the frame, a workpiece-side slider provided on another side of the frame in the thickness direction in a manner capable of moving along the longitudinal direction of the frame, and a distal-end swing shaft attached to the workpiece-side slider. The distal-end swing shaft includes a workpiece support section that is for supporting a workpiece and that is supported by the workpiece-side slider in a manner capable of swinging around an axis line extending in a width direction of the frame, and an actuator that is attached to the workpiece-side slider and that is for causing the workpiece support section to swing.

According to the present aspect, by causing the wrist-side slider and the workpiece-side slider to move in a lengthwise direction of the frame in a state where the wrist-side slider is fixed to a wrist of a robot and a workpiece is supported by the workpiece support section of the distal-end swing shaft attached to the workpiece-side slider, the workpiece may be transferred at a high speed in the longitudinal direction of the frame, and also, the reach may be extended to the extent of a movable range of each slider and a stroke two times the movable range of each slider may be obtained.

Furthermore, by causing the workpiece support section to swing by operation of the actuator of the distal-end swing shaft, the attitude of a workpiece supported by the workpiece support section may be changed around the axis line extending in the width direction of the frame.

In this case, the workpiece support section is driven by the actuator fixed to the workpiece-side slider, and thus, the actuator and the workpiece support section may be disposed close to each other, thereby eliminating the need for a long, low-rigidity timing belt for transmitting power of the actuator to the workpiece support section. Accordingly, friction loss occurring at the timing belt may be greatly reduced, and the power of the actuator may be efficiently transmitted to the workpiece support section to drive the workpiece support section with high accuracy, and also, fluctuations in load torque at the distal-end swing shaft may be swiftly detected.

In the aspect described above, the actuator may include a motor, a reducer for reducing speed of rotation of the motor, and a power transmission section for transmitting output of the reducer to the workpiece support section.

This allows a torque which is amplified by reduction in the speed of rotation of the motor by the reducer to be transmitted to the workpiece support section by the power transmission section. Accordingly, the size and weight of the motor may be reduced.

Furthermore, in the aspect described above, the power transmission section may transmit the output of the reducer to the workpiece support section after reducing the output.

This allows the torque output from the reducer to be amplified and transmitted also at the power transmission section, and thus, the size and weight of the reducer may be reduced.

Furthermore, in the aspect described above, the motor may be disposed non-coaxially with the axis line, and the workpiece support section may include a shaft extending on both sides of the frame in the width direction, and a pair of interface portions provided on both ends of the shaft.

This allows a device, such as a hand for attaching/detaching a workpiece, extending on both sides in the width direction with the frame at the center to be easily attached to the pair of interface portions on both sides of the shaft and to be disposed with a good weight balance. By disposing the motor non-coaxially with the axis line of swinging of the workpiece support section, a structure where the shaft is extended on both sides of the frame in the width direction may be easily adopted.

Moreover, in the aspect described above, the pair of interface portions may include attachment surfaces that are parallel to each other.

This eliminates the burden of having to perform angle alignment between a device and each interface portion at the time of attaching a device to the pair of interface portions.

REFERENCE SIGNS LIST

1 transfer tool
7 wrist unit (wrist)
18 frame
19 slider (wrist-side slider)
20 slider (workpiece-side slider)
30 articulated robot (robot)
36 workpiece support section
37 distal-end swing shaft
38 shaft
39, 40 interface portion
41 attachment surface
42 motor (actuator)
43 reducer (actuator)
44 gear (drive gear, power transmission section, actuator)
45 gear (driven gear, power transmission section, actuator)
51 friction coupling (interface portion)
F axis line

The invention claimed is:

1. A transfer tool comprising:
   a substantially strip-shaped frame;
   a wrist-side slider to be attached to a wrist of a robot, provided on one side of the frame in a thickness direction in a manner capable of moving along a longitudinal direction of the frame;
   a workpiece-side slider provided on another side of the frame in the thickness direction in a manner capable of moving along the longitudinal direction of the frame;
   an actuator attached to the workpiece-side slider, the actuator comprising a motor;
   a shaft attached to the workpiece-side slider so as to extend in a width direction of the frame, the shaft being rotated by rotation of the motor;
   wherein the motor is disposed non-coaxially with an axis line of the shaft; and
   a strut extending in the width direction of the frame, the strut being fixed on each of both ends of the shaft and used for gripping a workpiece.

2. The transfer tool according to claim 1, wherein the actuator includes a reducer for reducing speed of rotation of the motor, and a power transmission section for transmitting output of the reducer to the shaft.

3. The transfer tool according to claim 2, wherein the power transmission section transmits the output of the reducer to the shaft after reducing the output.

4. The transfer tool according to claim 1, further comprising
   a pair of interface portions, for fixing the strut, provided on both ends of the shaft.

5. The transfer tool according to claim 4, wherein the pair of interface portions include attachment surfaces that are parallel to each other.

* * * * *